UNITED STATES PATENT OFFICE.

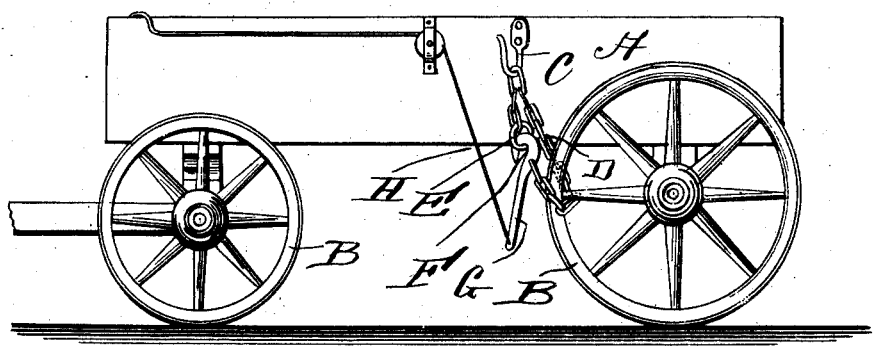
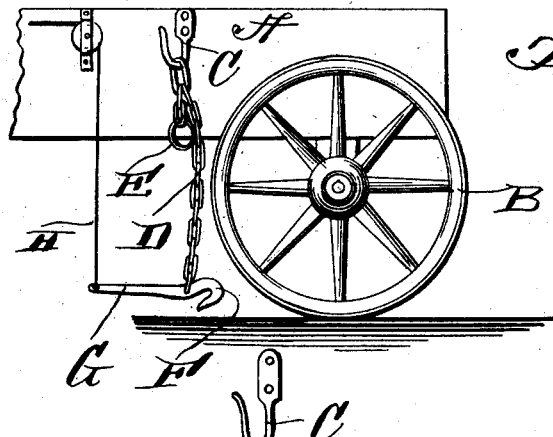
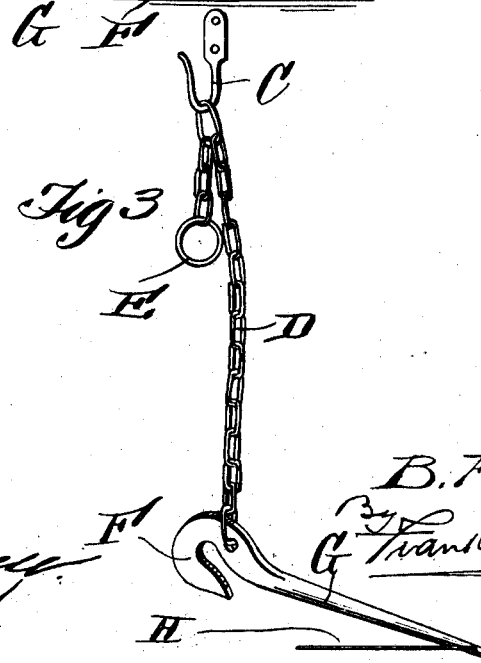

BENJAMIN FRANKLIN HORNSBY, OF GRANGEVILLE, LOUISIANA.

VEHICLE-WHEEL BRAKE.

No. 882,759.  Specification of Letters Patent.  Patented March 24, 1908.

Application filed November 9, 1907. Serial No. 401,503.

*To all whom it may concern:*

Be it known that I, BENJAMIN FRANKLIN HORNSBY, a citizen of the United States, residing at Grangeville, in the parish of St. Helena and State of Louisiana, have invented certain new and useful Improvements in Vehicle-Wheel Brakes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in braking mechanism for the wheels of vehicles and comprises essentially a chain having means for fastening one of the links thereof to the box of the vehicle and having a hook with a shank portion forming a handle which is adapted to be connected to a rope or chain whereby it may be lifted to cause the hook to disengage one of the hooks of the brake chain.

The invention comprises various other details of construction and combinations and arrangement of parts which will be hereinafter fully described and then specifically defined in the appended claims.

I illustrate my invention in the accompanying drawings, in which:—

Figure 1 is a side elevation of a vehicle showing the application of the brake in holding a wheel. Fig. 2 is a detailed view showing the brake mechanism when not in use, and Fig. 3 is a detailed view showing the brake mechanism detached from the vehicle.

Reference now being had to the details of the drawings by letter, A designates a wagon box and B the wheels of the running gear of a vehicle.

C designates a hook which is fastened to the side of the vehicle box in any suitable manner and adapted to support the brake chain when in use or otherwise.

D designates a brake chain which is caught over the hook C in any of the links thereof and has a ring E fastened to one end and its other end is fastened to a hook having an elongated shank portion G.

In applying the brake, the chain is passed between the spokes of the wheel and the hook F caught in the ring E in the manner shown in Fig. 1 of the drawings. When the device has been thus adjusted, the shank portion G of the hook will hold the hook F in engagement with the ring E. If the rope H is utilized for tilting the shank G to release the hook, said rope may be passed through the pulley upon the side of the wagon and may be within convenient reach of the person within the wagon box. If the rope is dispensed with, the shank G may be tilted by a person raising up upon the lower end thereof sufficiently to cause the hook at the end thereof to disengage the ring E. After the brake has been released from the vehicle wheel, the hook F may be passed back through the spokes of the wheel and either supported in the manner shown in Fig. 2 or the hook F may be caught up upon the hook C. It will be understood that, when the rope H is utilized for the purpose of disengaging the hook from the link of the chain, said rope will also have to be passed with the hook F through two of the spokes of the wheel.

From the foregoing, it will be noted that, by the provision of the brake mechanism shown and described, a simple and efficient means is afforded whereby a wheel of a vehicle may be held from turning and readily detached when it is desired to release the same.

What I claim to be new is:—

A brake for vehicle wheels comprising, in combination with a vehicle wheel and box, a hook fastened to the box, a chain having a link intermediate its end engaging said hook, a ring fastened to one end of said chain, a hook fastened to the other end of the chain, said hook having a shank portion designed to normally hold its hook in engagement with said ring, a cord connected to the end of said shank portion, and a pulley over which the cord passes affording means whereby the shank of said hook may be lifted to allow the hook at the end thereof to disengage said ring, as set forth.

In testimony whereof I hereunto affix my signature in the presence of two witnesses.

BENJAMIN FRANKLIN HORNSBY.

Witnesses:
H. F. BUSBY,
J. D. TIDWELL.